Patented Sept. 21, 1926.

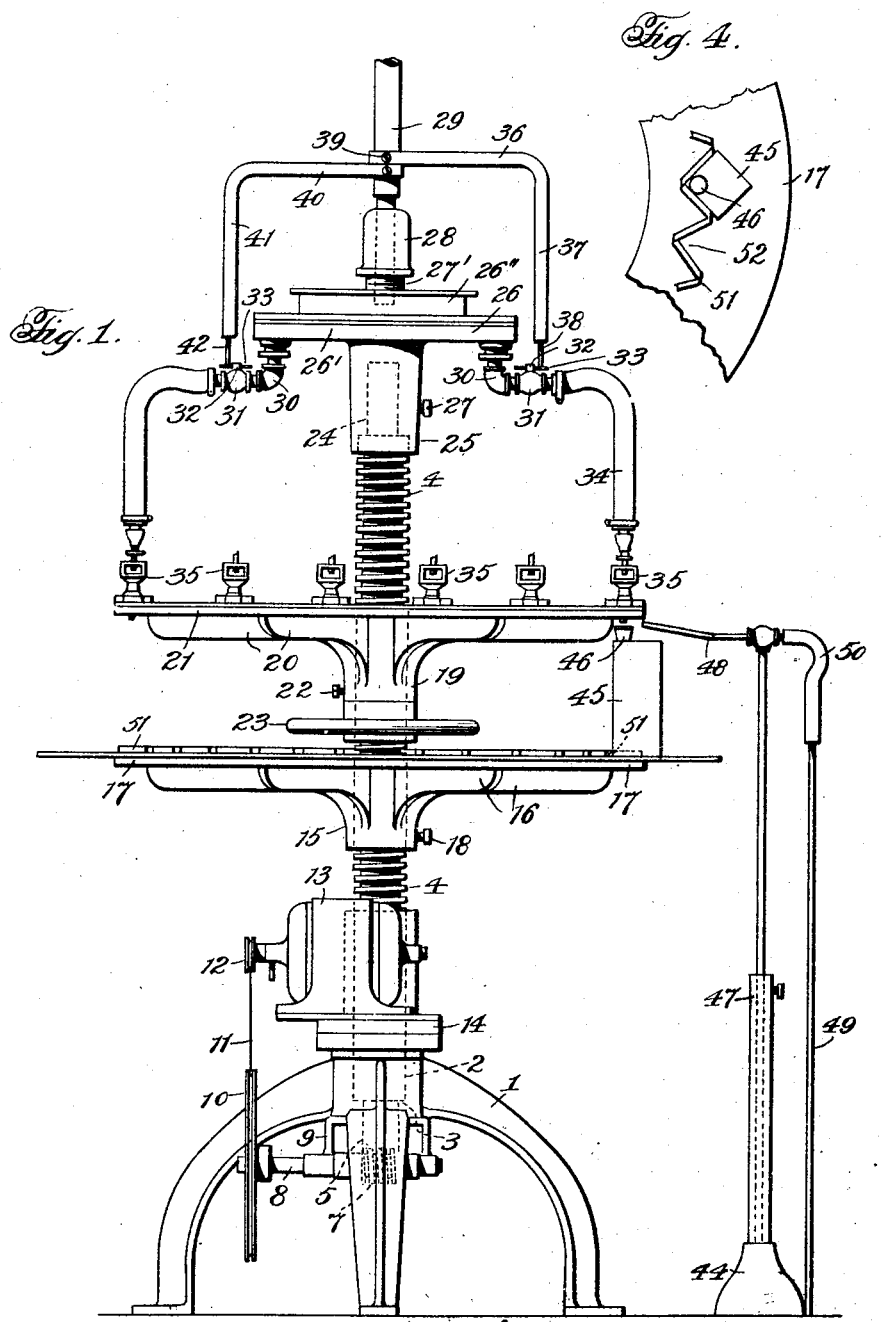

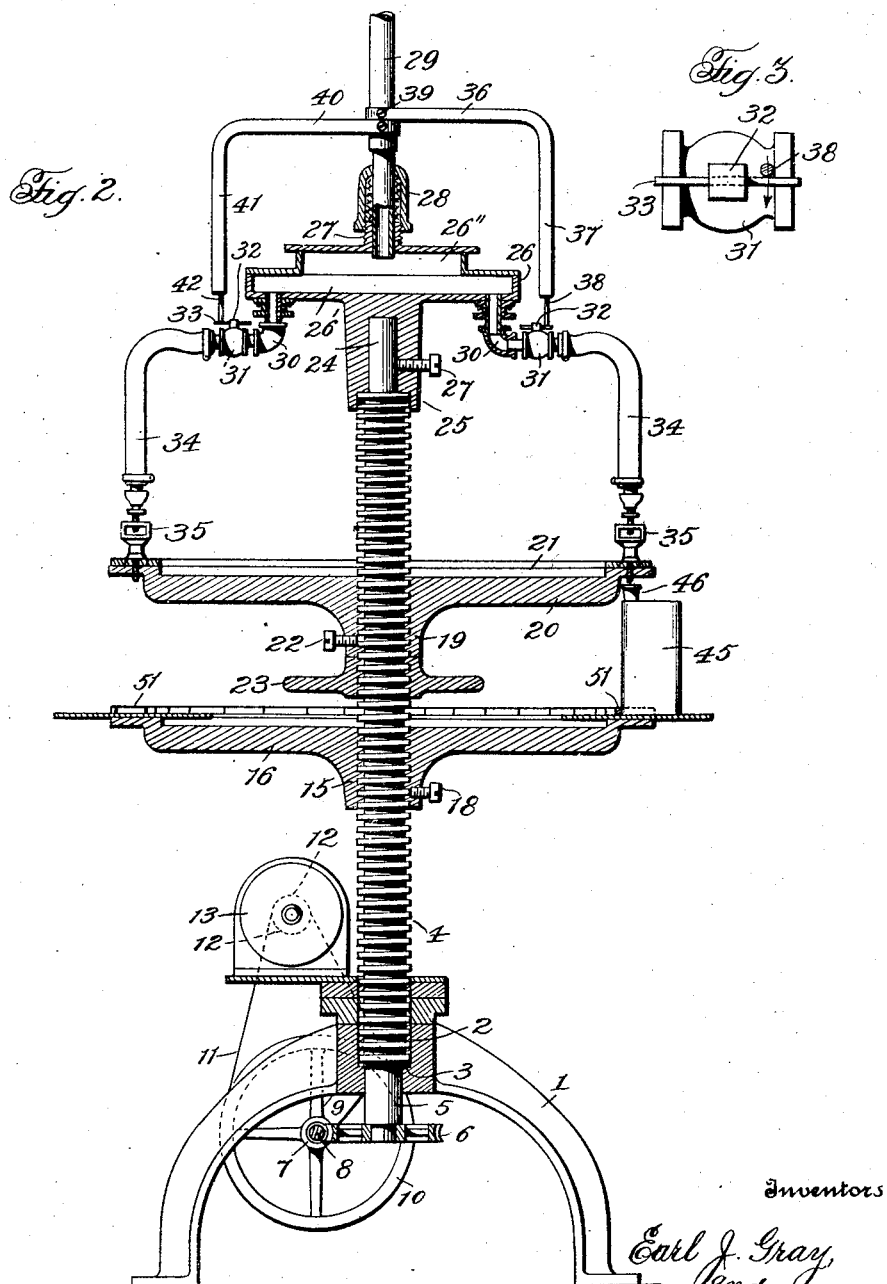

1,600,467

UNITED STATES PATENT OFFICE.

EARL J. GRAY AND THEODORE L. WANTOCK, OF CHICAGO, ILLINOIS, ASSIGNORS TO O-CEDAR CORP'N., OF CHICAGO, ILLINOIS.

SOLDERING MACHINE.

Application filed December 9, 1922. Serial No. 605,924.

Our invention relates to new and useful improvements in soldering machines and more particularly to a machine of this character adapted for soldering nozzles upon cans or similar containers.

The primary object of our invention resides in the provision of a soldering machine which is automatic in its operation with the exception of the placing and renewal of the cans onto and off their support.

Another object of the invention consists in providing a machine in which the soldering is done through means of gas burners directing a flame into the nozzle as distinguished from the present method of inserting a hand tool within the nozzle.

A further object resides in the provision of means for automatically turning on and cutting off the supply of gas to the burners, said means being adjustable so as to leave the burners lighted for various lengths of time thus allowing a sufficient time for the thoroughly soldering of the nozzles to the cans.

Still another object consists in providing an adjustable table for supporting the cans or similar containers and means whereby the burners may be adjusted with respect to the cans.

With the above and other objects in view, which will appear as the description proceeds, our invention consists in the novel details of construction, and arrangement of parts, described in the following specification and illustrated in the accompanying drawings, and while we have illustrated and described the preferred embodiments of the invention as they now appear to us it will be understood that such changes may be made as will fall within the scope of the appended claims.

In the drawings:—

Fig. 1 is a side elevation.

Fig. 2 is a transverse vertical section with parts shown in elevation.

Fig. 3 is a top plan of the valve, and

Fig. 4 is a fragmental top plan of the supporting table showing the article positioning member.

In the drawings the numeral 1 indicates the base, in the present instance, shown as being formed with supporting legs, having a central opening 2 formed at the bottom with an inturned flange 3 to form a seat for the end of a threaded shaft 4 which has a reduced extension 5 on its lower end which passes entirely through the opening in the base as quite clearly shown in the drawings. Secured to the reduced extension 5 is a horizontal worm gear 6 which meshes with the worm gear 7 carried by the shaft 8 which is supported in the depending brackets 9 formed on or secured to the base. A pulley 10 is secured to one end of the shaft 8 and is driven through means of a belt 11 which in turn is driven from the pulley 12 secured to the shaft of the electric motor 13. The electric motor 13 is supported upon the platform 14 formed integral with or secured to the base 1 and may receive its energy from any source of supply.

Received on the shaft 4 is the interiorly threaded casting 15 which has the radiating arm 16 supporting a table 17. The casting 15 may be adjusted vertically upon the shaft 4 by rotating and will be held in its adjusted positions by means of the set screw 18 or other suitable fastening member. Carried upon the shaft 4, above the casting 15, is an interiorly threaded casting 19 which has the radiating arms 20 supporting a burner ring or support 21. The casting 19 may be vertically adjusted upon the shaft 4 by rotating and will be held in its adjusted positions by the set screw 22 and by the wheel 23 which is also vertically adjusted upon the shaft 4 by rotating and is adapted to engage the bottom of the casting 19.

The upper end of the shaft 4 is reduced as shown at 24 and receives thereon the depending sleeve 25 of a gas chamber 26. This sleeve is preferably interiorly threaded for a portion of its length to receive the end of the threaded shaft 4 and the sleeve will be held in its adjusted positions, against rotation, by means of a set screw 27 or other suitable fastening means. The gas chamber 26 is of the construction quite clearly shown and comprises the bottom portion 26' and the upper portion 26" which is of slightly less diameter than the bottom portion. A threaded sleeve 27' is formed on or secured to the upper compartment 26" of the gas chamber and receives thereon the stuffing box 28 of any usual or well known construction. This stuffing box receives the lower end of a gas supply pipe 29 which may be secured to any suitable support and suspended therefrom.

Leading from the underside of the bottom portion 26' of the gas chamber 26 are a plurality of L-shaped coupling members 30, preferably of metal, to which are secured the valve casings 31 which receive the rotatable valves 32. Each of these rotatable valves 32 has a passage therethrough, so that the passage through the valve will be opened and closed, successively, through each quarter turn of the valve. Extending transversely through the upper end of each valve, at right angles to one another, are the rods or pins 33 which will be engaged to operate the valves in a manner to be later described. Leading from each of the valve casings or housings is a flexible tube 34 which is secured at its lower end to a burner 35 which is carried by the burner ring 21. The burners are of the well known Bunsen type and are secured to the ring 21 in such a manner as to direct their flames beneath the ring. As the burners are of the well known construction it is thought that a detail description of the construction thereof is not necessary at the present time.

Secured to the gas supply pipe 29, above the gas chamber 26, is an arm 36 having the depending portion 37 carrying at its lower end a pin or projection 38 adapted to lie in the path of the pins or rods 33 of the valves 32. The arm 36 will be held against rotation with respect to the gas supply pipe by means of the set screws 39 or other suitable fastening means. An arm 40 is also carried by the gas supply pipe 29 and this arm has the depending portion 41 also carrying a pin or projection 42 which will lie in the path of the pins or rods 33 of the valve 32. This arm 41 will be held against rotation with respect to the gas supply pipe 29 by means of the set screw or other suitable fastening means. The burner 35 will be lighted, when the supply of gas is admitted thereto, by means of a pilot light. This pilot light comprises the base 44 which carries a telescopic standard 47 on the upper end of which is carried a burner tube 48 which extends beneath the burner ring or support 21 in close proximity to the burners 35. Gas is supplied to the burner tube 48 through means of the gas supply pipe 49 and the flexible connection 50.

The cans 45 are adapted to be supported upon the table 17 and the nozzles 46 which have previously been dipped in solder in the well known manner, will be placed over the openings in the cans and as the cans are operated beneath the burners the solder will pass through the openings in the cans and securely solder or connect the nozzles thereto.

A zig-zag guide or positioning member 51 is formed on or secured to the top of the table 17 and provides V-shaped portions 52 to receive the cans as more particularly shown in Fig. 4, this guide or positioning member properly positioning the cans beneath the individual burners.

From the above detail description it is thought that the construction of our machine will be clearly understood but we will now endeavor to describe a little more in detail the operation. It has been the previous practice, in soldering nozzles to cans, by the sweating process, to first dip the nozzles into the solder and then invert them and place them over the opening in the top of the can. A heated hand tool was then placed into the nozzle and by the sweating process the solder carried by the nozzle would pass through the opening in the can and secure the nozzle thereto. This has been a long tedious process and in perfecting the machine above described in detail the soldering of the nozzles to the cans may be done in much less time and a greater number of cans may be turned out in a day by a single operator. It will be understood that when the motor 13 is operated it will, through means of the pulley 12, belt 11, pulley 10, shaft 8, and worm gears 7 and 6, rotate the threaded shaft 4 which is rotatably carried by the base 1. The table 17 and burner ring 21 will also be rotated with the shaft as will the gas chamber 26 and the connections leading therefrom to the burner 35. The gas supply pipe 29 with the arms 36 and 44 will not be rotated but instead will be held stationary. The cams 45, with the disconnected nozzles 46, which have been dipped in the solder, will be placed upon the table 17, it being understood that the nozzles 46 will be over the openings in the top of the cans and the nozzles will be positioned so as to lie directly beneath one of the burners 35. As the shaft 4 is rotated the pins or rods 33 of the valves 31 will be brought into engagement with the depending portion of the arm 36 and this engagement will rotate the valve to open the gas passage between the gas chamber 26 and the burner 35. The burners will be lighted by the pilot light 44 and the burner will continue lighted until the pin of the valve 32 comes into engagement with the pin or projection 42 carried by the depending portion 41 of the arm 40. This will rotate the valve 32 a quarter turn and cut off the gas supply to the burners. The can, with the nozzle secured thereto, may be removed and a new one placed in position and the operation continued. The arm 36, which we will term the valve opening arm, will preferably be held in one position at all times but the arm 40 which we will call the valve closing arm, may be adjusted with respect to the arm 36 so that the gas supply may be left on a longer time or shut off at a shorter interval. The table 17 for supporting the cans may be vertically adjusted upon the shaft 4 as may also the burner ring 21. By the adjustment of the table and burner ring the several parts may be adapted for cans of different heights. The burners being connected to the flexible tubes 34 allows the ring 21 to be adjusted without in any way breaking the connections. The stuffing box 28 allows for a tight fit between the gas supply pipe 29 and the gas chamber 26 so that there will be no leakage. The gas passes from the gas supply pipe 29 to the gas chamber 26 from the gas chamber 26 through the couplings 30 and 31 to the flexible tubes 34, and then to the burner 35. It will be noted that the valve is operated a quarter turn upon each engagement with the operating arms and while we preferably, in the machine shown, use eighteen of the burners 35, and associated parts, it will be understood that any desired number may be used as found convenient or adapted for the required purposes.

Having fully described our invention what we claim as new and desire to secure by Letters Patent is:—

1. A soldering machine comprising a table for supporting a plurality of the articles to be soldered, a burner supported over each of the articles, means for supplying fuel to the burners, and means for automatically turning on and off the fuel supply.

2. A soldering machine comprising a table for supporting a plurality of the articles to be soldered, a burner supported over each of the articles, means for supplying fuel to the burners, means for automatically turning on and cutting off the fuel supply, and means for rotating the table and burners.

3. A soldering machine comprising a table for supporting a plurality of the articles to be soldered, a burner supported over each of the articles to be soldered, a gas chamber, a flexible connection between the gas chamber and each of the burners, and means for automatically turning on and shutting off the supply of gas from the chamber to the flexible connections.

4. A soldering machine comprising a base, a standard rotatably supported by the base, a table carried by the standard for supporting the articles to be soldered, burners carried by the standard and supported over the articles to be soldered, a fuel chamber carried by the standard, means forming communication between the burners and fuel chamber, means for supplying fuel to the chamber, and means for automatically turning on and cutting off the fuel supply from the chamber to the burners.

5. A soldering machine comprising a base, a standard rotatably supported by the base, means for rotating the standard, a table carried by the standard and supporting the articles to be soldered, burners carried by the standard and supported over the articles to be soldered, a gas chamber carried by the standard, means for supplying gas to the chamber, connections between the chamber and burners, valves in said connections, and means engageable with the valves for opening and closing the same upon rotation of the standard.

6. A soldering machine comprising a base, a standard rotatably supported by the base, means for rotating the standard, a table carried by the standard for supporting the articles to be soldered, burners carried by the standard and supported over the articles to be soldered, a fuel chamber carried by the standard, means for admitting fuel to the chamber, connections forming communications between the fuel chamber and burners, rotatable valves carried by said connections, and means engageable with said rotatable valves for operating the same upon rotation of the standard.

7. A soldering machine comprising a base, a standard rotatably supported by the base, means for rotating the standard, a table carried by the standard for supporting the articles to be soldered, burners carried by the standard and supported over the articles to be soldered, a fuel chamber, a pipe for supplying fuel to the chamber, connections between the chamber and burners, valves carried by said connections, and depending arms carried by the fuel supply pipe and engageable with the valves for operating the same.

8. A soldering machine comprising a table for supporting a plurality of the articles to be soldered, a burner supported over each of the articles, means for supplying fuel to the burners, means for automatically turning on and off the fuel supply, and means for lighting the burners when the fuel supply is turned on.

9. A soldering machine comprising a table for supporting a plurality of the articles to be soldered, a burner supported over each of the articles, means for supplying fuel to the burners, means for automatically turning on and off the fuel supply, and a pilot light extending into close proximity to the burners for lighting the same when the fuel supply thereto is turned on.

10. A soldering machine comprising a table for supporting a plurality of the articles to be soldered, a burner supported over each of the articles, means for supplying fuel to the burners, means for automatically turning on and off the fuel supply, and a pilot light for successively lighting the burners as the fuel thereto is turned on.

11. A soldering machine comprising a table for supporting a plurality of the articles to be soldered, a burner supported over each of the articles, means for supplying fuel to the burners, means for automatically turning on and off the fuel supply, and a pilot light for successively lighting the burners as the fuel supplied thereto is turned on, said pilot light comprising a support, a burner carried by the support and extending into proximity to the first mentioned burner, and means for supplying fuel to the pilot burner.

12. A soldering machine comprising a table for supporting a plurality of the articles to be soldered, a burner supported over each of the articles, means for supplying fuel to the burners, means for automatically turning on and off the fuel supply, and a pilot light for successively lighting the burners when the fuel supply thereto is turned on, said pilot light being adjustable with respect to the article supporting table.

13. A soldering machine comprising a table for supporting a plurality of the articles to be soldered, a burner supported over each of the articles, means for supplying fuel to the burners, means for automatically turning on and off the fuel supply, and a pilot light for successively lighting the burners as the fuel supply thereto is turned on, said pilot light comprising an adjustable support, a burner secured to the support and extending into close proximity to the first mentioned burner, and means for supplying fuel to the pilot light.

14. A soldering machine comprising a table for supporting an article to be soldered, a burner positioned above the article, means for automatically turning on a supply of fuel to the burner and means for turning off the supply of fuel at the lapse of a predetermined time.

15. A soldering machine comprising a rotatable table for supporting a plurality of the articles to be soldered, a burner positioned over each of the articles, means for automatically supplying fuel to the burners, and means for successively turning on and off the supply of fuel to the burners upon the rotation of the table.

16. A soldering machine comprising a rotatable table for supporting a plurality of the articles to be soldered, a burner positioned over each of the articles, means for automatically supplying fuel to the burners, means for turning on the supply of fuel to the burners at a predetermined point in the rotation of the table, and means for automatically turning off the supply of fuel to the burners at another point of the rotation of the table.

In testimony whereof we affix our signatures.

EARL J. GRAY.
THEODORE L. WANTOCK.